United States Patent
Beaulieu

(10) Patent No.: US 6,661,968 B2
(45) Date of Patent: Dec. 9, 2003

(54) CONTINUOUS HEATING OF LIQUID TO CONSTANT TEMPERATURE

(75) Inventor: Alain Beaulieu, Vallauris (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/125,621

(22) Filed: Apr. 17, 2002

(65) Prior Publication Data

US 2002/0141742 A1 Oct. 3, 2002

Related U.S. Application Data

(63) Continuation of application No. PCT/EP00/09510, filed on Sep. 28, 2000.

(30) Foreign Application Priority Data

Nov. 2, 1999 (EP) .............................. 99121661

(51) Int. Cl.[7] ................................................ F24H 1/08
(52) U.S. Cl. ...................................................... 392/471
(58) Field of Search ................................ 392/471, 473, 392/474, 477; 99/275, 302 R; 222/146.1, 146.2

(56) References Cited

U.S. PATENT DOCUMENTS 4,169,978 A  10/1979  Hauslein ..................... 219/297
4,744,291 A  5/1988  Wallin ........................ 99/280

FOREIGN PATENT DOCUMENTS

| EP | 0307955 | 3/1989 |
| EP | 0540440 | 5/1993 |
| EP | 0676163 | 10/1995 |
| EP | 0771542 | 5/1997 |
| EP | 0862883 | 9/1998 |
| EP | 0935938 | 8/1999 |
| FR | 2683135 | 8/1999 |
| GB | 2113813 A | 8/1993 |

*Primary Examiner*—Thor Campbell
(74) *Attorney, Agent, or Firm*—Winston & Strawn LLP

(57) ABSTRACT

The invention relates to a device for the continuous heating of a liquid, such as water, to a constant temperature, particularly for domestic applications and more specifically for preparing coffee. The device includes a reservoir of water at ambient temperature, a pump, a heating unit whose electrical power supply is controlled by a switch, and a user outlet for delivering liquid at the desired temperature. The device also includes a component for regulating the flow rate of cold water delivered by the pump to the heating unit controlled by the temperature of the liquid leaving the heating unit and a component for recirculating water leaving the heating unit to the reservoir or to the inlet side of the pump for as long as this water has not reached a the constant operating temperature. The recirculation unit is controlled by the temperature of the water leaving the heating unit. The control is achieved by the use of a rated valve on the heated liquid outlet.

21 Claims, 6 Drawing Sheets

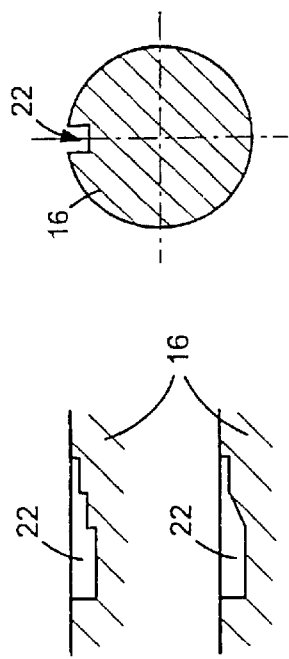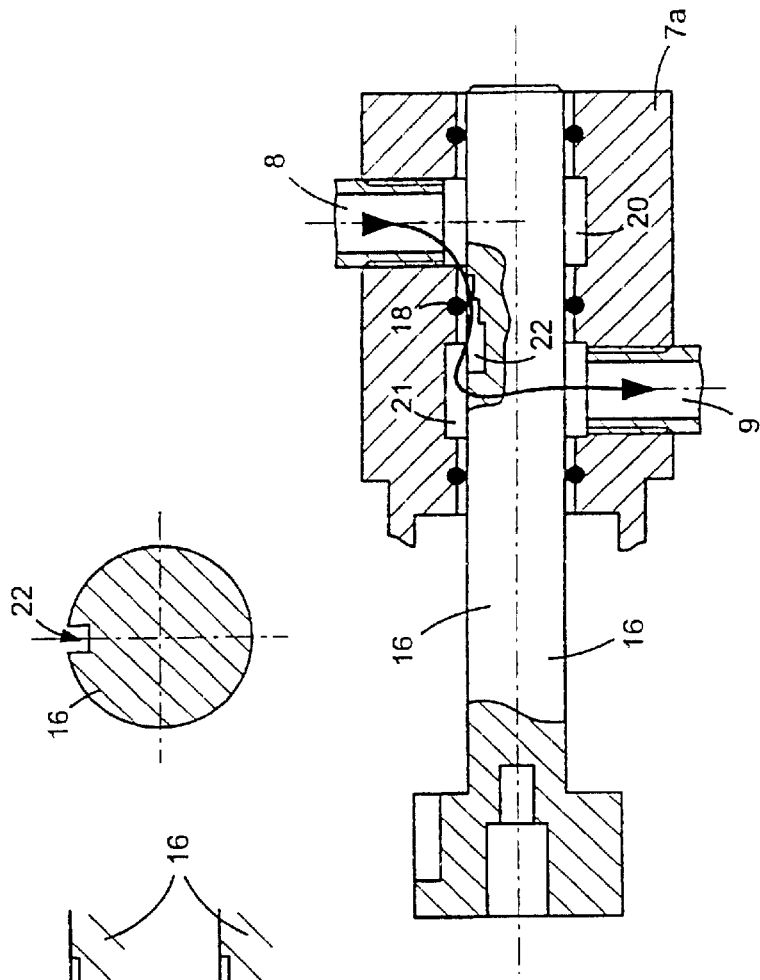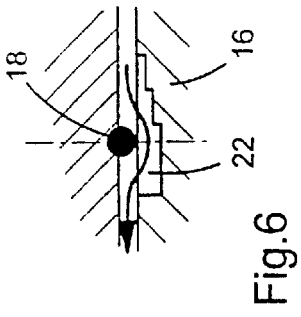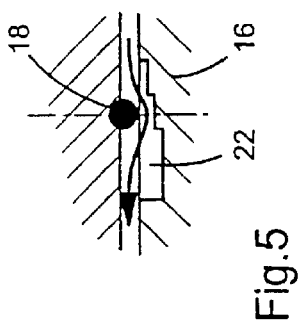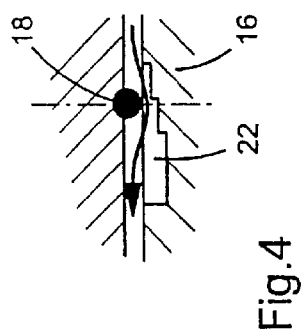

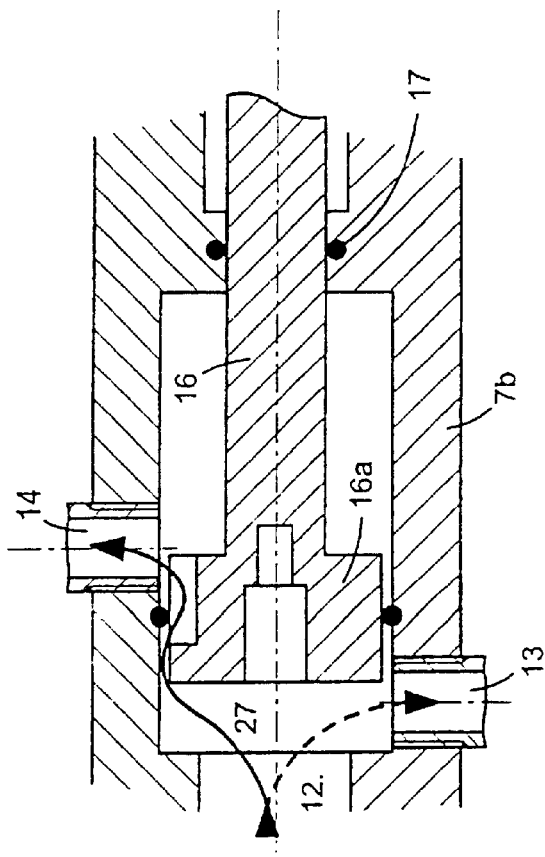
Fig. 9
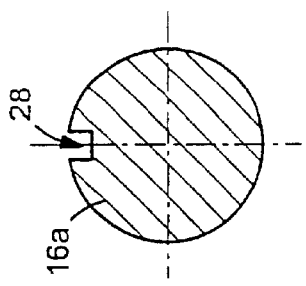
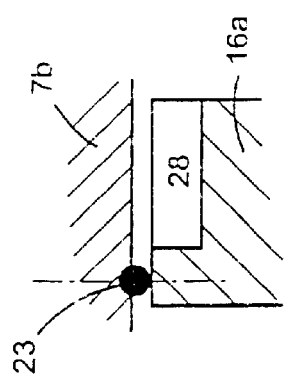
Fig. 12
Fig. 11
Fig. 10

CONTINUOUS HEATING OF LIQUID TO CONSTANT TEMPERATURE

CROSS-REFERENCE TO RELATED APPLICATIONS

This application is a continuation of the U.S. National Stage designation of International application no. PCT/EP00/09510 filed Sep. 28, 2000, the content of which is expressly incorporated herein by reference thereto.

BACKGROUND

The present invention relates to a device and method for the continuous heating of a liquid to a constant temperature. A particular application of this invention is the heating of a liquid such as waiter to a constant and precise temperature to allow, for example, the preparation of food. In particular, this device and this method may be used to advantage for heating water under pressure for making coffee.

For making coffee, discontinuous water-heating devices in which a given amount of water is heated, then used with the aid of a pump to make the coffee, are known. In such devices, the volume of water available is limited, the heating time is long and it is inevitable that there will be a period of waiting between each making of coffee. In addition, these devices are bulky and expensive.

There also exist some devices for the continuous heating of water, where the water is heated as it passes along a duct or pipe embedded in a block with a high heat capacity to guarantee constant temperature. The volume of water that can be used is limited by the heat capacity of the block, and in any event the devices needed to regulate the electrical power supply and/or the amount of water delivered are not capable of achieving sufficient temperature precision using economical means. Again, the heating time is long.

Such devices for the continuous heating of water for making coffee are known, for example, from the following documents: EP 0 307 955, EP 0 676 163, EP 0 771 542 and FR 2 683 135. Despite these disclosures, there still remains a need for improvements in continuous heating devices for liquids.

SUMMARY OF THE INVENTION

The present invention relates to a device for the continuous heating of a liquid to a constant temperature which device is economical, precise as regards the temperature at which the liquid is let out, the heating unit of which does not require high thermal inertia and which does not therefore require a long time for heating of the liquid.

The device and method of the present invention for the continuous heating of a liquid to a constant temperature obviates the disadvantages of the known devices and makes it possible to achieve the aforementioned goals.

Thus, the invention specifically relates to a device for the continuous heating of a liquid to a constant temperature. The device includes a reservoir of an ambient temperature liquid, a pump having an inlet and outlet, a heating unit, a heated liquid outlet for delivering heated liquid at a preselected temperature, a control device for regulating flow of liquid delivered by the pump to the heating unit, a recalculation device for recirculating liquid leaving the heating unit to one of the reservoir or the inlet side of the pump when the liquid has not reached the predetermined temperature, and a rated valve on the heated liquid outlet for sensing the temperature of the heated liquid before delivering it from the heating unit.

Advantageously, both the control device and recirculation devices are controlled based on the temperature of the liquid leaving the heating unit. Preferably, the control and recirculating devices are combined into a single unit, and a thermostatic element which reacts in response to the temperature of the liquid leaving the heating unit to control the operation of the control and recirculation devices to assure that heated liquid is delivered at the preselected temperature.

The combined control/recirculation unit preferably comprises a first (or cold) part formed of a first body comprising an inlet for liquid delivered by the pump, an outlet for liquid to pass to the heating unit, and a flow control nozzle having a structure which can alter liquid flow to the heating unit. The combined control/recirculation unit further comprises a shut-off nozzle, a second (or hot) part comprising a second body coaxial with, secured to and thermally insulated from the first body, an inlet that receives liquid leaving the heating unit, a chamber that is in fluid association with the second body inlet to receive liquid therefrom, the chamber further being in fluid association with the heated liquid outlet and being connected, via the shut-off nozzle, to a recirculation outlet that is in fluid association with the pump inlet, and the chamber housing the thermostatic element.

The thermostatic element preferably includes a piston, and the combined control/recirculation unit includes a first bore in the first part of the unit, second, larger bore in the second body of the unit, a rod member having a body which is slidably received in the first bore and a head that is of larger size than the body that is received in the second bore, and a spring operatively associated with the rod head and thermostatic element, such that the piston acts on the rod head against the action of the spring to position the rod in the respective first and second bores depending upon the temperature of the liquid therein so that the nozzles can direct the liquid to achieve the predetermined temperature prior to allowing the heated liquid to exit the heated liquid outlet.

The first body preferably comprises an inlet chamber in fluid association with the pump inlet and an output chamber in fluid association with the heated liquid outlet, and the nozzle includes a radial slot opening onto the periphery of the rod, the cross section of which varies along the longitudinal axis of the rod, this slot making it possible, depending on the axial position of the rod, for the inlet chamber to be connected to the outlet chamber by passages of different cross sections, and in that when the rod is in the position of rest, the passage cross section is at a minimum. Advantageously, first and second seals are operatively associated with the rod and are located in the first and second bodies, respectively.

In a preferred embodiment, the rod head includes a radial milling opening on its periphery and over part of its length which, depending upon the axial position of the rod head in the second bore, either fluidly connects the chamber of the second body to the recirculation outlet or prevents such fluid connection. In this arrangement, the second seal is located between the chamber and the recirculation outlet.

The device may include a switch, with the heating unit having an electrical power supply that is controlled by the switch, and the temperature sensor operatively associated with the switch. Also, the heating unit preferably can be one that has low thermal inertia, the liquid can be water and the heated liquid outlet is in fluid association with a percolator for brewing coffee.

The thermostatic element is preferably one of the wax cartridge type, liquid vaporization type, is based on a shape-memory metal or is based on a metal having a high coefficient of expansion to facilitate axial displacement. Also, the device may include a temperature sensor mounted on the recirculation device for controlling electrical power to the pump. In another preferred arrangement, the flow control nozzle includes a passage having a variable cross-section for regulating the flow rate of liquid delivered to the heating unit continuously or in discrete increments.

The invention also relates to a method for the continuous heating of a liquid to a constant preselected temperature. The method includes the steps of delivering a quantity of ambient temperature liquid to a heating unit for heating of same, sensing the temperature of the heated liquid leaving the heating unit to determine if it has achieved the preselected temperature, and delivering heated liquid that has achieved the preselected temperature.

Advantageously, the heated liquid is recirculated to the heating unit until the heated liquid has achieved the preselected temperature. The liquid is preferably delivered by a pump to a heating unit that has low thermal inertia, and the heated liquid is recirculated to the pump if the preselected temperature is not achieved.

Also, the delivery of liquid to the heating unit can be regulated to a minimum value that is significantly below that which represents an amount of liquid that can be heated to the preselected temperature by the heating unit, with the recirculation being continued until the heated liquid achieves the preselected temperature. When the temperature of the liquid leaving the heating unit is sensed as meeting or exceeding the preselected temperature, the delivery of liquid to the heating unit can be increased. Preferably, the sensing of the liquid temperature is utilized to control the flow of liquid from the pump to the heating unit as well as for the recirculation of the heated liquid to the pump.

BRIEF DESCRIPTION OF THE DRAWINGS

The appended drawings diagrammatically and by way of example illustrates one embodiment of the heating device according to the invention.

FIG. 3 is a partial section on a larger scale, through the flow rate regulator.

FIGS. 4, 5 and 6 illustrate, on a larger scale, three different positions of the flow rate regulator depending on the temperature of the water.

FIG. 8 illustrates two alternative forms of a detail of the flow rate regulator.

FIG. 9 is a sectional view on a larger scale of the recirculation device.

FIGS. 10, 11 and 12 illustrate various positions of the water recirculation device according to the temperature of this water.

DETAILED DESCRIPTION OF THE PREFERRED EMBODIMENTS

Figure 1:
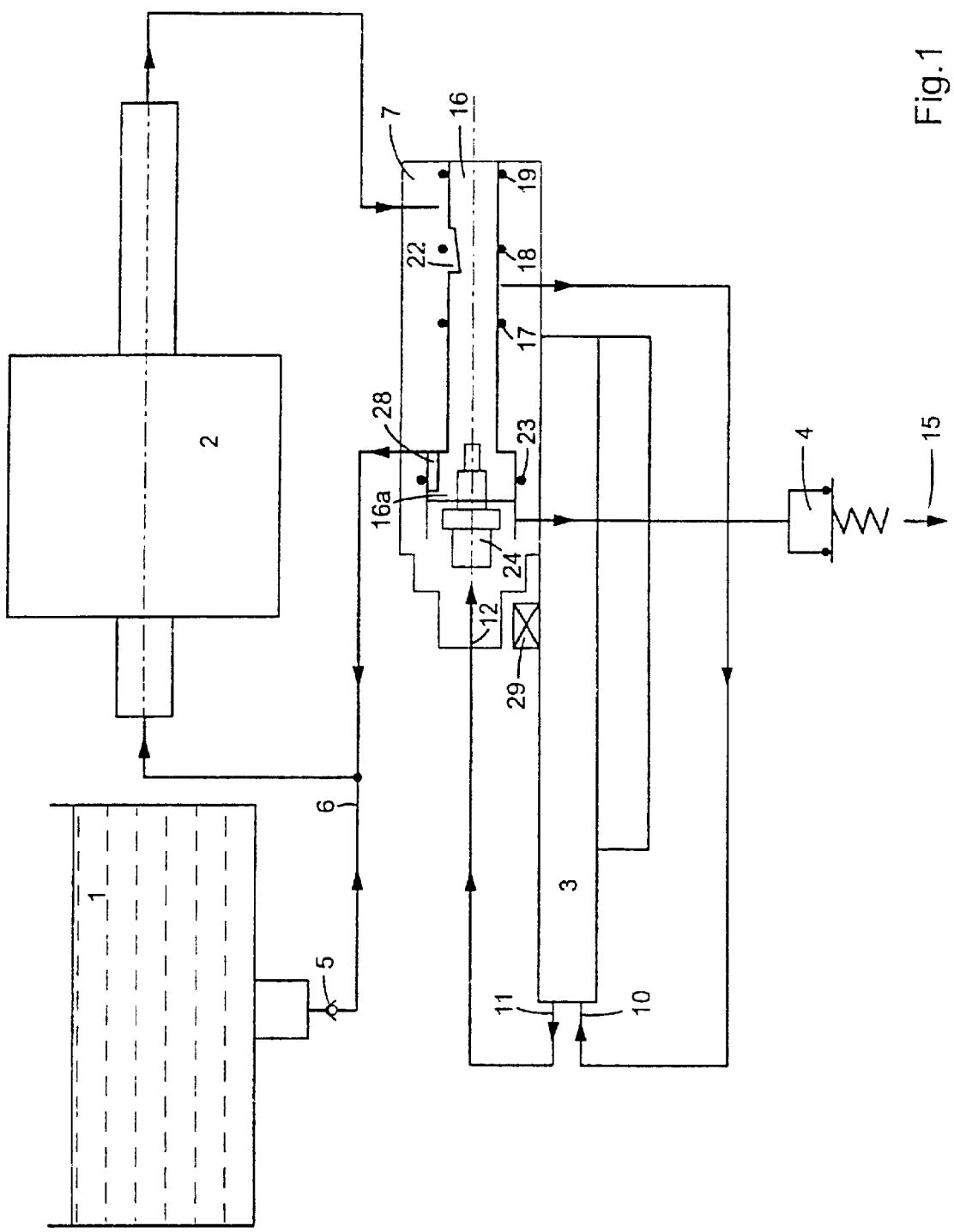
FIG. 1 is a block diagram of the continuous heating device.
Figure 2:
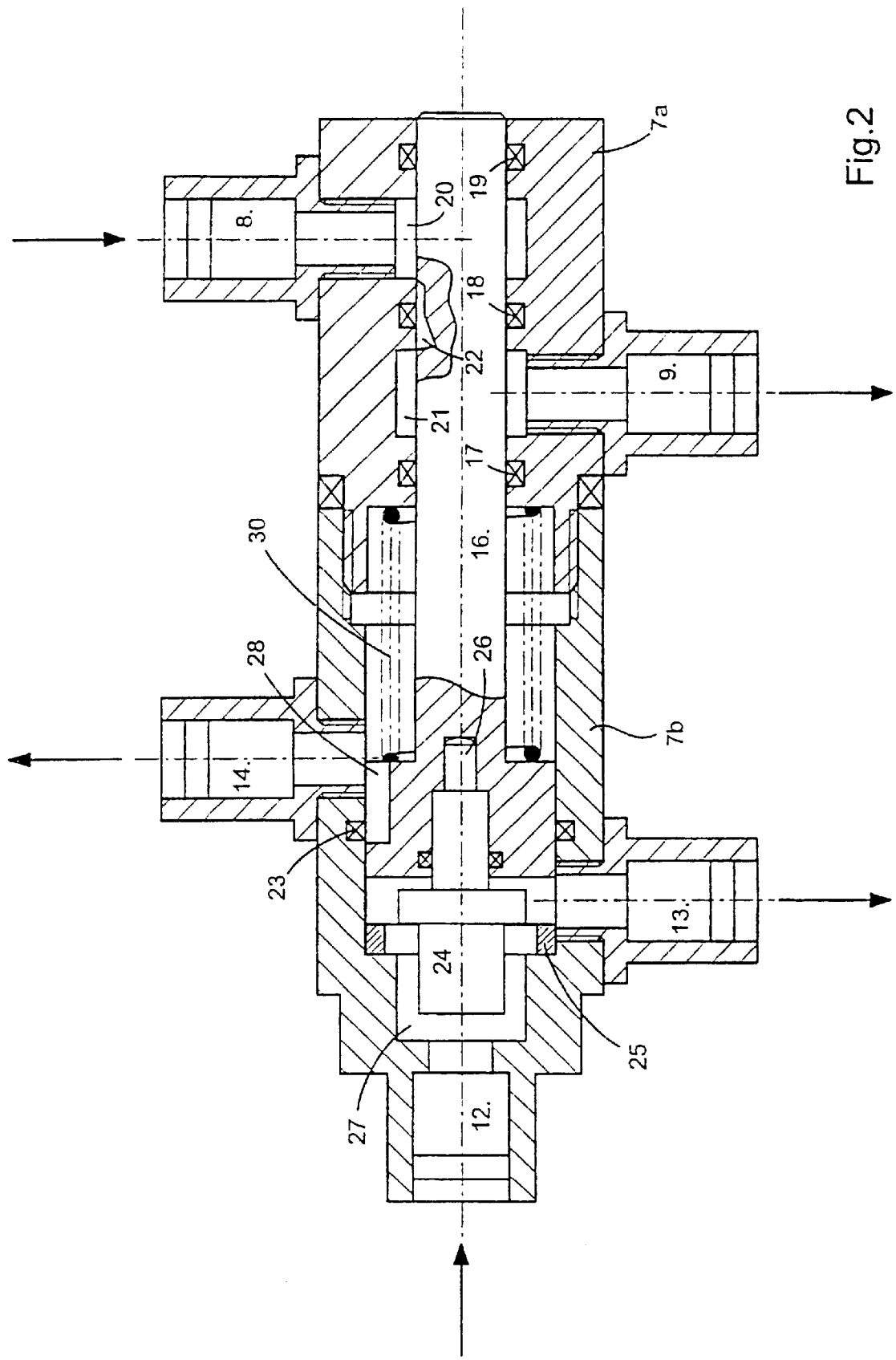
FIG. 2 is a longitudinal section through a device for regulating the flow rate and recirculation of water.

The device for the continuous heating of a liquid to a constant temperature according to the embodiments illustrated in the drawings utilizes water as an example of the type of liquid that can be heated. A commonplace use of heated water is for preparing heated beverages such as coffee. This device comprises a reservoir 1 of water at ambient temperature, a pump 2 which takes in the water or the liquid contained in the reservoir 1 and a heating unit of heating body 3 through which the pumped water or liquid passes and comprising a user outlet fitted with a valve 4.

Figure 7:
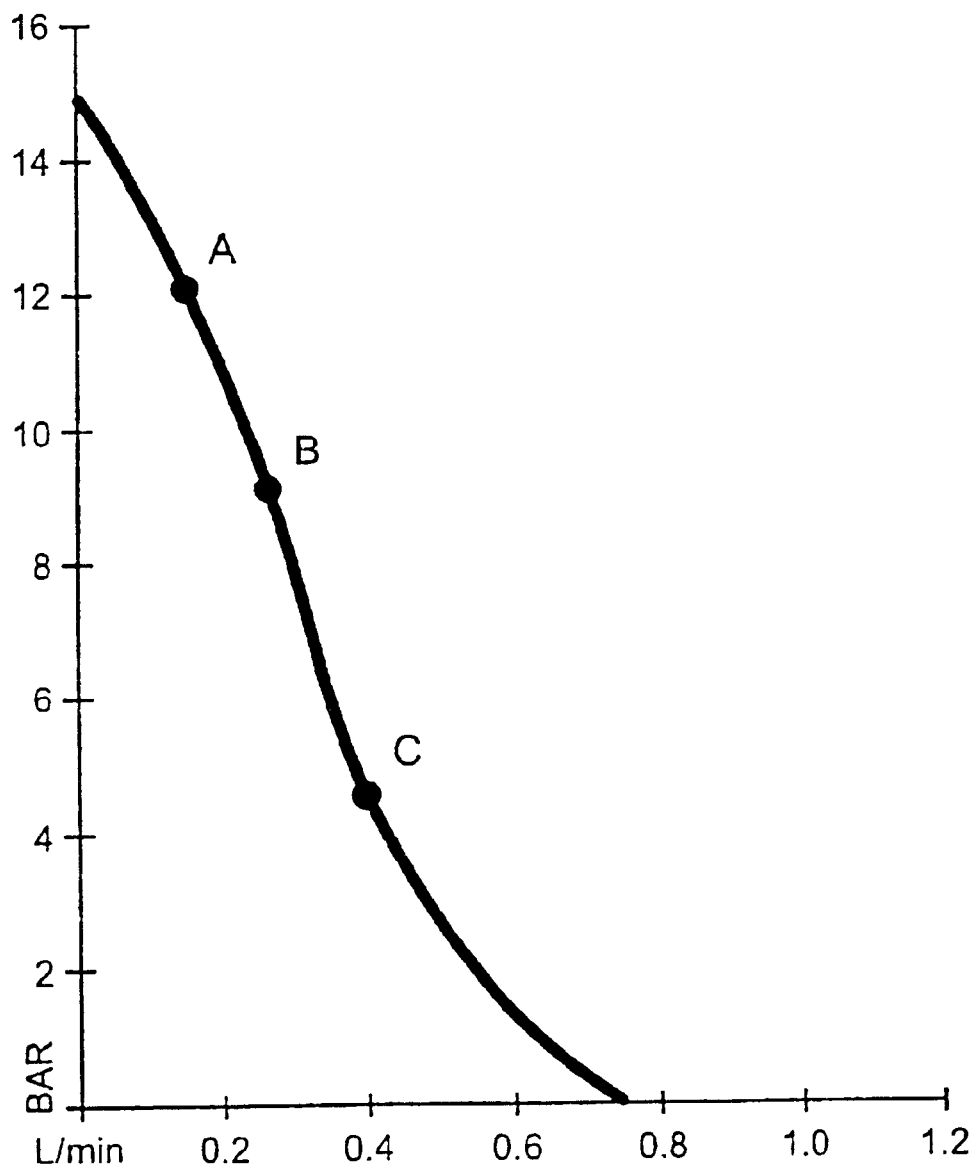
FIG. 7 illustrates the relationship between the flow rate and the water pressure according to the position of the flow rate regulator and therefore according to the temperature of the water.

The cold water pump 2 has characteristics suited to the desired use, for example the making of coffee, particularly as regards its "pressure-flow rate" characteristics. This pump may, for example, be of an electromechanical type and has characteristics similar to those depicted in FIG. 7.

The reservoir 1 is equipped with a non-return valve 5 to prevent any return of water or liquid to the tank 1 via the pipe 6 connecting it to the pump 2.

The heating body 3 has a power suited to the nominal flow rate of liquid to be heated and may consist of a water or liquid tube thermally connected to a resistive electric element. This unit is made as a single piece or by assembling or connecting the two tubes, one acting as a duct for the liquid and the other housing the resistive electric element, and has a low heat capacity. The length of the tubes and their diameter chiefly depend on the flow rate of liquid and on the desired power. Such heating units exist and are commercially available. The cross section of the water tube is suited to the nominal flow rate of the continuous-heating device and may be made of various materials, particularly stainless steel, and may possibly be treated to inhibit the build-up of scale.

The continuous-heating device illustrated further comprises a device for regulating the water flow rate and the recirculation of water or liquid when this water or liquid has not reached its set-point temperature.

This flow rate/recirculation regulator unit 7 comprises a cold part 7a containing the flow rate regulator and a hot part 7b containing a thermostatic regulator and the water recirculation device. The hot part of this flow rate/recirculation regulator unit is preferably fixed to or mounted on the heating body 3. This flow rate/recirculation regulator unit 7 is supplied with cold water by the pump 2 via the inlet 8 of its cold part, to supply the flow rate regulator, the outlet 9 of which supplies the inlet 10 of the heating body 3. The outlet 11 of the heating body is connected to the inlet 12 of the hot part 7b of this unit 7. This hot part 7b of the unit 7 has two outlets, one being a hot water user outlet 13 and the other 14 being for recirculating water which has not yet reached its set-point temperature.

The user outlet 13 is connected by the valve 4 to a percolator 15 for making coffee, for example, or to any other piece of apparatus that uses the heated liquid.

The flow rate/recirculation regulator unit 7 is illustrated in greater detail in FIGS. 2 to 12 and comprises a body made in two cylindrical parts 7a, 7b mounted end to end axially one on the other, but thermally insulated from each other.

The cold part 7a containing the flow rate regulator comprises an axial central bore accommodating a regulating rod 16 sliding in this bore by virtue of seals 17, 18, 19. This cold part 7a of the unit 7 comprises a water inlet chamber 20 which is annular and located between the seals 18 and 19, in direct communication with the cold water inlet 8 supplied by the pump 2. This cold part 7a of the unit 7 also comprises a water outlet chamber 21, which is annular and located between the seals 17 and 18, in direct communication with the outlet 9 feeding the heating body with cold water.

The flow rate regulator consists of a nozzle, the water passage cross section of which can vary according to the axial position of the rod 16. This nozzle is formed of a radial slot 22 made in the rod 16 and opening onto its periphery to allow the inlet chamber 20 to be connected to the outlet chamber 21 of the cold part 7a of the unit 7 according to the axial position of the rod 16 via a duct of minimum cross section up to a maximum cross section. As can be seen in FIG. 8, the shape of the radial slot 22 may exhibit a continuous slope or a step shape. It is thus possible, by choosing the shape of the cross section of the slot 22, to define the function whereby the water flow rate varies according to the axial displacements of the rod 16 in the body 7a.

The hot part 7b of the unit 7 comprises a bore of larger diameter than that of the cold part 7a in which the head 16a of the rod 16 slides via a seal 23. A thermostatic element 24 is fixed, with the aid of a ring 25, to the body 7b of the unit 7. The moving piston 26 of this thermostatic element 24 rests against the closed end of the bore made in the head 16a of the rod 16.

This hot part 7b of the unit 7 comprises a first chamber 27 supplied with hot water by the inlet 12 of the hot part supplied by the outlet 11 of the heating body 3. This first chamber 27 is connected directly to the outlet 13 of this hot part supplying the valve 4 and percolator 15.

The peripheral surface of the head 16a of the rod 16 has a radial milling 28 over part of its length so that the first chamber 27 can be connected, according to the position of the rod 16, to the recirculation outlet 14 of the unit 7. This recirculation outlet 14 is connected to the duct 6 connecting the reservoir 1 to the pump 2.

A spring 30 tends to keep the rod 16 in a position of rest, displaced towards the hot part 7a, for which position the cold water flow rate regulated by the nozzle 22 is minimal, and for which the water recirculation outlet 14 is connected to the first chamber 27 of the hot part 7b of the unit 7.

The flow rate regulator and the recirculation device are both operated by the rod 16, which is itself subjected to the action of the heat-sensitive element 24. This heat-sensitive element 24 may be of the wax cartridge type, liquid vaporization type, of the type with metal, with shaped memory, or of the type with metals with a high coefficient of expansion, for example.

Figure 13:
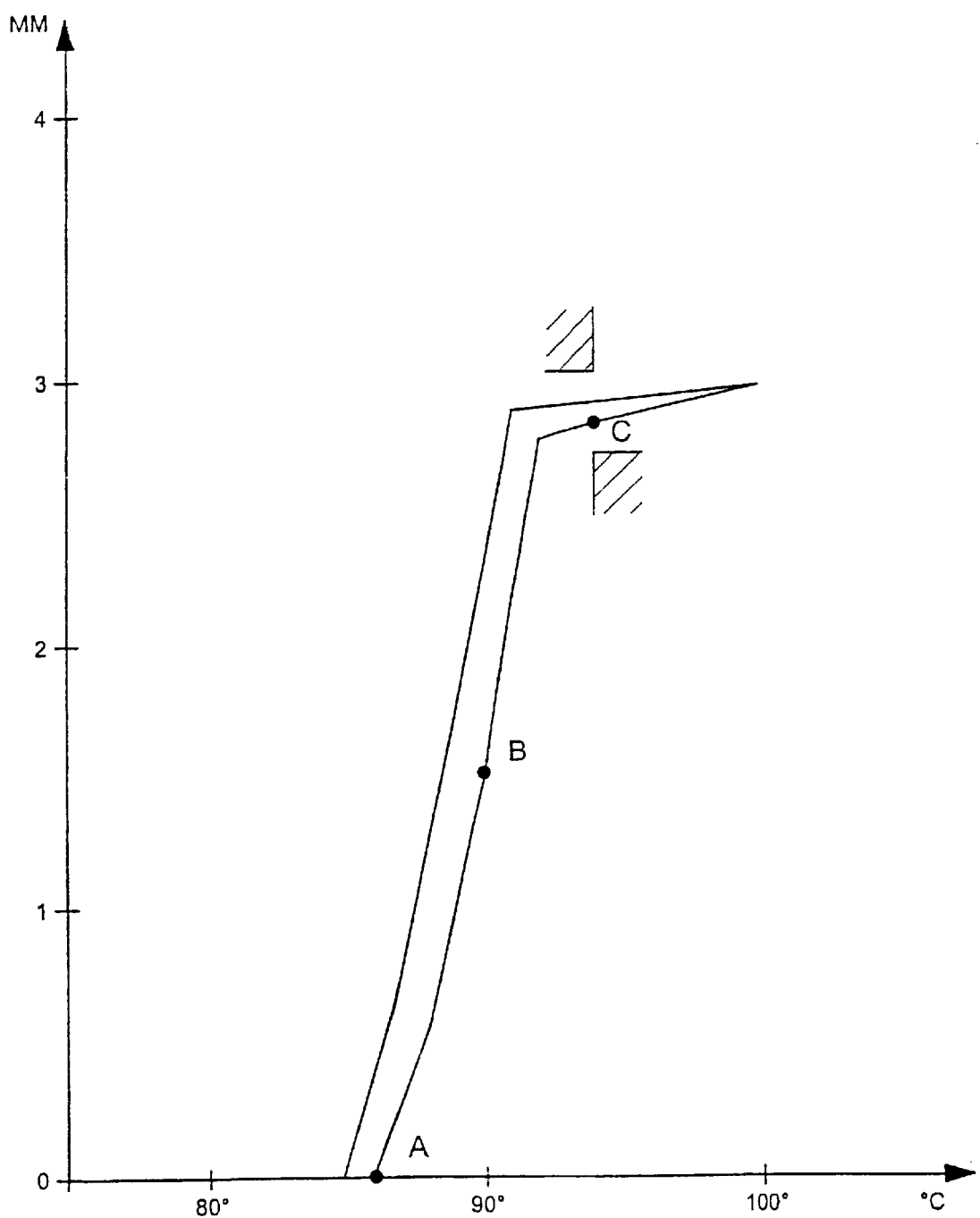
FIG. 13 is a diagram illustrating the travel of the thermostatic element of the device for regulating the flow rate and recirculation, according to the temperature of the water leaving the heating unit.

The feature sought in this application is chiefly its ability to produce a displacement under load, for a precise temperature. The criteria of hysteresis, faithfulness, speed and cost mean that elements of the wax cartridge type are particularly suited to the use made thereof in this device for regulating flow rate and recirculation of water. The characteristic of such a thermostatic element of the wax cartridge type is illustrated by way of example in FIG. 13.

The way in which the continuous-heating device described operates is as follows:

In the "off" position, the rod 16 is in a position of rest, displaced to the left under the action of the spring 30 so that the cold water inlet chamber 20 is connected to the outlet chamber 21 of the flow rate regular by a small cross section of the nozzle 22. The flow rate of cold water is therefore low. Still in this rest position, the first chamber 27 of the hot part 7b is connected by the milling 28 to the recirculation outlet 14 of the hot part 7b.

When the user switches on the heating device, it applies power to the heating body 3. The low thermal inertia of this heating body allows a quick rise in temperature. When the preheat temperature is reached, a thermostatic switch 29 fixed to the heating body automatically or manually switches on the water pump 2. The pump thus supplies the heating body 3 with cold water, at a low flow rate, the flow rate regulator being in the minimum flow rate position. The water leaving the heating body is introduced into the first chamber 27 of the recirculator and sensitizes the thermostatic element 24. As long as the operating temperature is not reached, the displacement of the rod 16 under the effect of the thermostatic element is not enough to isolate the chamber 27 from the recirculation outlet 14 and all the water pumped is recirculated to the inlet pump 2, and mixed with cold water. In effect, as long as sufficient pressure is not established in the chamber 27, namely a pressure higher than the retaining force of the valve 4, water cannot be delivered to the percolator.

As the temperature of the water entering the chamber 27 gradually increases, the rod 16 is displaced to the right, increasing the passage cross section of the nozzle 22 and decreasing that of the nozzle 28. Thus, by way of example, for a temperature of the water in the first chamber 27 of the hot part 7b of 86° C. or lower, the flow rate regulator is in the position illustrated in FIG. 4 and the recirculation device is in the position illustrated in FIG. 10 and the operating point is point A of FIGS. 7 and 13.

Above the minimum temperature desired for using the water, the piston 26 of the heat-sensitive element 24 displaces the rod 16 by increasing the flow rate of cold water to its nominal value and decreases the cross section of the recirculation nozzle 28. At the nominal temperature, for example 90° C., the position of the nozzles 22 and 28 are illustrated in FIGS. 5 and 11 and the operating point corresponds to point B in FIGS. 7 and 13. The recirculation nozzle 28 is shut off, the pressure in the chamber 27 rises and exceeds the retaining force of the valve 4, and water is supplied to the percolator.

If the temperature rises above this nominal value, the rod 16 continues its travel to the right and the nozzle 22 increases further in cross section and the flow rate becomes very much higher than the nominal flow rate (FIGS. 6, 12) and the operating point lies at C (FIGS. 7 and 13), so that the temperature of the water entering the chamber 27 decreases automatically, the heating body no longer being powerful enough to heat to the desired temperature a flow rate of water which is appreciably higher than the nominal flow rate for which it is designed. Thus, the rod 16 is displaced to the left, once again reducing the cold water flow rate.

As long as the heating device delivers hot water, the temperature of the water let out is thus automatically regulated to its desired nominal usage value.

When the user switches off the heating device, the pump 2 and the heating body are switched off.

The heating device described is beneficial and advantageous in a number of respects:

it makes it possible to avoid delivering water as long as this water has not reached the desired temperature;

it reduces the time spent waiting before being able to use any hot water because it reduces the flow rate of water that is heated as long as the nominal temperature has not been reached;

water at a temperature below the desired usage temperature is recirculated to the pump inlet and mixed with cold water, which reduces the formation of scale;

the flow rate and recirculation regulating device is entirely mechanical, easy to produce, and employs just one thermostatic element to regulate the cold water flow rate and for the recirculation of water which is not hot enough for use. It is simple to produce and to use, it is inexpensive and its operational accuracy is high.

As has been seen earlier, one of the essential features of the invention lies in the fact of positioning, between the pump, the heating body and the percolator, a device for regulating the cold water flow rate and the recirculation of the heated water when this water has not reached its nominal temperature, these two functions being controlled simultaneously by a single heat-sensitive element.

Of course, this dual function of regulating the flow rate with which cold water enters the heating body and the delivery of water to the percolator or its recirculation may be obtained, preferably mechanically, by using a device which might be produced in a different way to the one described, but which also employs electromechanical or electronic regulation using a single sensor to sense the temperature of the water leaving the heating body.

The method of the invention is for the continuous heating of a liquid, generally water, to a constant temperature. A quantity of water is pumped from a reservoir of cold water, or water at ambient temperature, through a heating body which has low thermal inertia so that hot water can be delivered at a determined temperature to a user outlet, for example a percolator. This method is outstanding in that the flow rate of cold water delivered to the heating body, on the one hand, and the proportion of hot water recirculated to the inlet side of the pump, on the other hand, are regulated according to the temperature of the water leaving the heating body. According to this method, water is not delivered to the user outlet until it has nominally reached its preselected temperature and until this hot water reaches a determined pressure. A single temperature sensor controls the regulating of the cold water flow rate and, at the same time, the extent to which the hot water is recirculated.

Using this method, at the start of the heating of the water, only a small flow rate of water is delivered to the heating body, this allowing the water to be heated up quickly and, as long as the water has not reached a minimum usage temperature, this water is recirculated to the pump inlet. It is not until the temperature of the water leaving the heating body reaches its nominal value that the recirculation of water is stopped, causing the water to increase in pressure and to be delivered to the hot water user outlet. At the same time, the flow rate of cold water delivered to the heating body increases.

If the hot water exceeds the fixed nominal temperature, the flow rate of cold water delivered to the heating body increases further, thus causing a drop in temperature of the water leaving the heating body.

Using this method, the heating time needed to raise the temperature of the water leaving the heating body to its nominal value is shortened, it is possible to avoid delivering water to the user outlet as long as this water has not reached its nominal value, and the value of the temperature of the water delivered is then regulated by regulating the flow rate of cold water entering the heating body.

To sum up, it may be recalled that the method and the device for the continuous heating of a liquid comprise the following features:

A) Regulating the temperature of the water at outlet by regulating the flow rate of the water at ambient temperature contained in a reservoir 1 and delivered by a pump 2.

The flow rate regulation is achieved by a variable nozzle device 22 controlled by a heat-sensitive element 24 placed in the circuit of the hot water leaving a heating body 3.

The heating body 3 may have a constant power suited to the desired water flow rate, without the need for a high heat capacity or a great deal of thermal inertia.

Its preheat time will therefore be minimal and the cost of these heating bodies, which are mass produced, is low.

Regulating the cold water flow rate makes it possible to restrict the build-up of scale, this being an important phenomenon which is difficult to overcome in high-temperature water circuits.

The flow rate regulation is achieved by varying the cross sections for the passage of the water, either gradually according to the displacement brought about by the thermostatic element, or in steps.

The flow rate of the water is very much lower than the flow rate that can be raised to the desired temperature given the heating power, as long as the set-point temperature is not reached.

At around the set-point temperature, the flow rate is close to the nominal flow rate dictated by the heating power.

When the temperature exceeds the set-point temperature, the flow rate becomes very much higher than the nominal flow rate.

B) The recirculation of hot water to a tank or to the reservoir, or to the intake side of the pump, this occurring as long as the set-point temperature is not reached.

The recirculation device is controlled by the same heat-sensitive element, with the objective of minimizing costs.

In the case of recirculation to the intake side of the pump, a hot water/cold water mixture makes it possible to limit the build-up of scale in the pump.

In addition, the device for regulating flow rate and recirculation is preferably made in two parts:

a cold part 7a containing the flow rate regulator and which can be made of plastic material, a hot part 7b containing the heat-sensitive element, the recirculation and the heating body, and made of a material with good thermal conduction, for example aluminium alloy. These two parts are thermally insulated.

This construction allows for great compactness, a minimum mass of components, and a very low water volume, which makes for very quick preheating.

The preheating of the hot part is controlled by a mechanical or electronic thermostatic element 29.

When the preheat temperature is reached, the thermostatic element 29 commands the switching-on of the pump automatically, or informs the user that preheating is finished.

The following operation is thus obtained:

The water contained in the reservoir 1 is taken up by the pump 2 and introduced at 8 into the flow rate regulator 22.

The water, the flow rate of which depends on the position of the control rod 16, itself displaced by the travel of the thermostatic element 24, leaves the flow rate regulator at 9 to enter the heating body 3, at 10.

The hot water emerges at 11 and, at 12, enters the hot part 7b of the regulator to sensitize the thermostatic element 24.

The water re-emerges, at 14, and is directed to the intake side of the pump 2 as long as the recirculation device 28 is not shut off by the displacement of the rod 16.

When the set-point temperature is reached, the thermostatic element 24 begins to displace the rod 16 and shuts off the recirculation device 28.

The water then leaves at 13 through a valve 4 to the percolation head 15.

In the embodiment illustrated, the device for regulating the flow rate of the cold water entering the heating body and the device for recirculating the water leaving the heating body as long as its temperature has not reached a minimum set-point value, are grouped together by construction into a single unit controlled by a single heat-sensitive element. This is advantageous from the points of view of construction, cost and bulk.

However, in an alternative form, these two devices for regulating the cold water flow rate and for recirculating the water leaving the heating body for the reservoir, the pump inlet or the tank, could be separate devices. These devices are controlled by the temperature of the water leaving the heating body preferably by using just one heat-sensitive element, but as an alternative, each device could be controlled by a separate sensor.

What is claimed is:

1. A device for the continuous heating of a liquid to a constant temperature, comprising a reservoir of an ambient temperature liquid, a pump having an inlet and outlet, a heating unit, a heated liquid outlet for delivering heated liquid at a preselected temperature, a control device for regulating flow of liquid delivered by the pump to the heating unit, the control device being controlled based on the temperature of the liquid leaving the heating unit, a recirculation device, comprising a first part and a second part, wherein the first and second parts are thermally insulated from each other, for recirculating liquid leaving the heating unit to one of the reservoir or the inlet side of the pump when the liquid has not reached the predetermined temperature, the recirculation device also being controlled based on the temperature of the liquid leaving the heating unit; and a rated valve on the heated liquid outlet.

2. The device according to claim 1, wherein the control device and the recirculating device are combined into a single unit, and further comprising a thermostatic element which reacts in response to the temperature of the liquid leaving the heating unit to control the operation of the control and recirculation devices to assure that heated liquid is delivered at the preselected temperature.

3. The device according to claim 1 the first part is formed of a first body comprising an inlet for liquid delivered by the pump, an outlet for liquid to pass to the heating body, and a flow control nozzle having a structure which can alter liquid flow to the heating unit.

4. A device for the continuous heating of a liquid to a constant temperature, the device comprising
   a reservoir of an ambient temperature liquid,
   a pump having an inlet and outlet, a heating unit,
   a heated liquid outlet for delivering heated liquid at a preselected temperature,
   a control device for regulating flow of liquid delivered by the pump to the heating unit, the control device being controlled based on the temperature of the liquid leaving the heating unit,
   a recirculation device for recirculating liquid leaving the heating unit to one of the reservoir or the inlet side of the pump when the liquid has not reached the predetermined temperature, the recirculation device also being controlled based on the temperature of the liquid leaving the heating unit;
   wherein the control device and the recirculating device are combined into a single unit, the single unit comprising
     a first part formed of a first body comprising an inlet for liquid delivered by the pump,
     an outlet for liquid to pass to the heating body, and a flow control nozzle having a structure which can alter liquid flow to the heating unit and a shut-off nozzle, and a second part comprising and
   a second part comprising a second body coaxial with, secured to and thermally insulated from the first body, an inlet that receives liquid leaving the heating unit, a chamber that is in fluid association with the second body inlet to receive liquid therefrom, the chamber further being in fluid association with the heated liquid outlet and being connected, via the shut-off nozzle, to a recirculation outlet that is in fluid association with the pump inlet, and the chamber housing the thermostatic element and
   a rated valve on the heated outlet, and a thermostatic element which reacts in response to the temperature of the liquid leaving the heating unit to control the operation of the control and recirculation devices to assure that heated liquid is delivered at the preselected temperature.

5. The device according to claim 4, wherein the thermostatic element includes a piston, and the combined control/recirculation unit includes a first bore in the first part of the unit, second, larger bore in the second body of the unit, a rod member having a body which is slidably received in the first bore and a head that is of larger size than the body that is received in the second bore, and a spring operatively associated with the rod head and thermostatic element, such that the piston acts on the rod head against the action of the spring to position the rod in the respective first and second bores depending upon the temperature of the liquid therein so that the nozzles can direct the liquid to achieve the predetermined temperature prior to allowing the heated liquid to exit the heated liquid outlet.

6. The device according to claim 5, wherein the first body comprises an inlet chamber in fluid association with the pump inlet and an output chamber in fluid association with the heated liquid outlet, and the nozzle includes a radial slot opening onto the periphery of the rod, the cross section of which varies along the longitudinal axis of the rod, this slot making it possible, depending on the axial position of the rod, for the inlet chamber to be connected to the outlet chamber by passages of different cross sections, and in that when the rod is in the position of rest, the passage cross section is at a minimum.

7. The device according to claim 6, which further comprises first and second seals operatively associated with the rod and being located in the first and second bodies, respectively.

8. The device according to claim 4, wherein the rod head includes a radial milling opening on its periphery and over part of its length which, depending upon the axial position of the rod head in the second bore, either fluidly connects the chamber of the second body to the recirculation outlet or prevents such fluid connection.

9. The device according to claim 8, wherein the second seal is located between the chamber and the recirculation outlet.

10. The device according to claim 1, which further comprises a switch, with the heating unit having an electrical power supply that is controlled by the switch, and wherein the temperature sensor is operatively associated with the switch.

11. The device according to claim 1, wherein the heating unit has low thermal inertia, the liquid is water and the heated liquid outlet is in fluid association with a percolator for brewing coffee.

12. The device according to claim 2, wherein the thermostatic element is of the wax cartridge type, liquid vaporization type, is based on a shape-memory metal or is based on a metal having a high coefficient of expansion to facilitate axial displacement.

13. The device of claim 2, which further comprises a temperature sensor mounted on the recirculation device for controlling electrical power to the pump.

14. The device according to claim 3, wherein the flow control nozzle includes a passage having a variable cross-section for regulating the flow rate of liquid delivered to the heating unit continuously or in discrete increments.

15. A method for the continuous heating of a liquid to a constant preselected temperature, which comprises delivering a quantity of ambient temperature liquid to a heating unit for heating of same, delivering the heated liquid to a recirculation device comprising a first part and a second part, wherein the first part and the second part are thermally insulated from each other, and the heated liquid is delivered to one of the first or second parts for sensing the temperature of the heated liquid leaving the heating unit to determine if it has achieved the preselected temperature, and delivering heated liquid that has achieved the preselected temperature.

16. The method of claim 15, which further comprises recirculating the heated liquid to the heating unit until the heated liquid has achieved the preselected temperature.

17. The method of claim 16, wherein the liquid is delivered by a pump to a heating unit that has low thermal inertia, and the heated liquid is recirculated to the pump if the preselected temperature is not achieved.

18. The method according to claim 15, wherein the delivery of liquid to the heating unit is regulated to a minimum value that is significantly below that which represents an amount of liquid that can be heated to the preselected temperature by the heating unit, until the heated liquid achieves the preselected temperature.

19. The method according to claim 18, wherein, when the temperature of the liquid leaving the heating unit is sensed as meeting or exceeding the preselected temperature, the delivery of liquid to the heating unit is increased.

20. The method according to claim 17, wherein the sensing of the liquid temperature is utilized to control the flow of liquid from the pump to the heating unit as well as for the recirculation of the heated liquid to the pump.

21. The method of claim 20 wherein the liquid is water and which further comprises directing heated water at the preselected temperature to a percolator for making coffee.

\* \* \* \* \*

UNITED STATES PATENT AND TRADEMARK OFFICE
CERTIFICATE OF CORRECTION

PATENT NO. : 6,661,968 B2
DATED : December 9, 2003
INVENTOR(S) : Beaulieu

It is certified that error appears in the above-identified patent and that said Letters Patent is hereby corrected as shown below:

Column 1,
Line 16, change "liquid such as waiter" to -- liquid such as water --; and
Line 61, change "a recalculation" to -- a recirculation --.

Column 5,
Line 32, change "the hot part 7a," to -- the hot part 7b, --.

Column 6,
Line 20, change "illustrated in FIG. 4" to -- illustrated in FIG. 3 --; and
Line 21, change "illustrated in FIG. 10" to -- illustrated In FIG. 9 --.

Column 9,
Line 35, change "according to claim 1" to -- according to claim 1, wherein --; and
Line 65, after "nozzle, and", delete "a second part comprising".

Column 10,
Line 8, change "thermostatic element and" to -- thermostatic element, and --.

Signed and Sealed this

Twenty-third Day of March, 2004

JON W. DUDAS
*Acting Director of the United States Patent and Trademark Office*